Patented Nov. 5, 1935

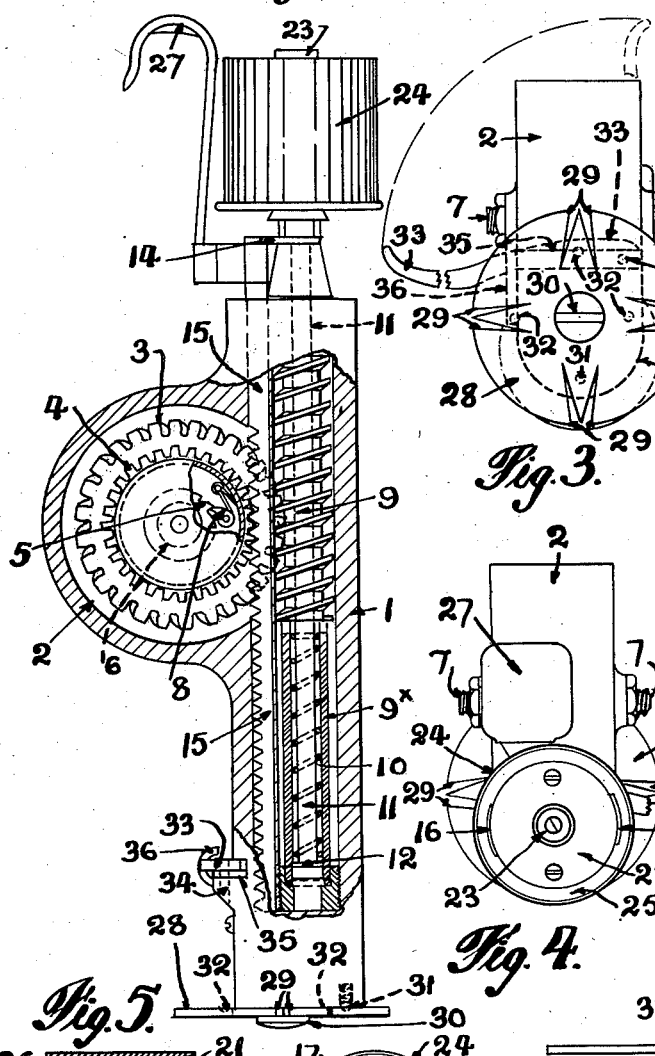

2,020,218

UNITED STATES PATENT OFFICE 2,020,218

APPARATUS FOR JOINING THE ENDS OF WIRES AND THE LIKE BY TWISTING THEM TOGETHER

William Horsfall Siddle, Chapel Allerton, Leeds, England

Application January 26, 1934, Serial No. 708,505
In Great Britain February 2, 1933

13 Claims. (Cl. 140—119)

This invention relates to apparatus for joining the ends of wires, more particularly in telephone and like cables, by twisting them together, and of the kind in which the ends of the wires to be joined are held or placed in a chuck which is then rotated to effect the desired twisting. It has before been proposed, in an apparatus working on these general lines, to actuate the rotary chuck by means of a spring motor, but this construction suffered from the disadvantage that it was necessary to wind it up for each twist made and the release of the spring for actuating the chuck caused a considerable shock to the hand of the user, making the instrument unpleasant and unsatisfactory in use; in consequence the twisting is being done by hand, what is known as the "organ twist" being adopted, this being a rule of thumb method that cannot give satisfaction as there is grave danger of fracture of the conductor wire. Now the object of the present invention is to provide an improved form of apparatus which will not be subject to this disadvantage and one, moreover, which will effect an improvement in the actual form of the twist itself, and which will render it unnecessary to solder wires of 20 lb. and 40 lb. gauge, as is the usual practice in telephone work.

According to the present invention, the rotary chuck is operated by positive mechanical means under the direct control of the user, thus rendering the twisting operation controllable and enabling it to be carried out as gradually and smoothly as may be desired.

In order that the invention may be clearly understood and readily carried into effect, the same will now be more fully described with reference to and by the aid of the embodiment illustrated in the accompanying drawing; wherein:—

Figures 1 and 2 are respectively a side elevation and a plan view of the apparatus.

Figures 3 and 4 illustrate elevations of the apparatus from opposite ends.

Figure 5 is a longitudinal section of the chuck of the apparatus, and Figure 6 is an end elevation of the chuck with the front plate removed for the sake of clearness.

Referring to the drawing, the apparatus comprises a casing 1, affording a centrally disposed housing 2, for a worm wheel 3, a co-axially arranged spur wheel 4, and a ratchet wheel 5. The worm wheel 3 and ratchet wheel 5 are fixed upon a common shaft 6 rotatably mounted between end bearings 7 afforded or carried by the housing 2, whilst the spur wheel 4 is freely rotatable on said shaft 6 and carries a spring-pressed pawl 8 whereby it is coupled to the worm-wheel 3 in one direction of rotation only. The worm wheel 3 meshes with a worm 9 having an axial through bore of rectangular section and a plain axial extension $9^\times$ with a larger bore affording a housing for a helical loading spring 10. The worm 9 with its extension $9^\times$ is rotatably mounted in ball bearings at its ends, and a rod 11 of rectangular cross-section makes a sliding fit in the bore of the worm and passes through that of the worm-extension $9^\times$, being provided with an enlargement or head 12 at its inner end between which and a shoulder in the bore the loading spring 10 acts to normally retain the said rod 11 within the casing 1. The outer end of the rod 11 has the barrel 13 of a chuck fixed thereto and passes through an eye in the end of an arm 14 which is connected to the outer end of a rack bar 15 which is arranged to slide in a guide afforded by the casing 1 and arranged parallel to the worm axis, said rack 15 being in mesh with the spur wheel 4.

The barrel 13 of the chuck is formed at its outer end with a diametrically disposed slot which accommodates and constitutes a guideway for a pair of gripping jaws or blades 16 which are pressed radially outward in opposite directions by springs 17 engaging the toes of the jaws or blades 16 and pins or studs 18 fixed in the end of the barrel 13. The forward end of the barrel 13 is provided internally and near its forward end with a grid or spider 19 the centre portion of which is adapted to afford an abutment 20 for the ends of the wires passed into the chuck by way of a central hole at 21 in said forward end. A cover plate 22 screwed to the forward end of the chuck barrel 13 serves to retain the gripping jaws or blades 16 in their slot and also afford a central conical guide or inlet member 23 for the wires to be twisted. A sleeve 24 surrounds the barrel 13 and has a conical or chamfered face 25 at its forward end which engages the outer ends of the gripping jaws or blades 16 to limit or control their radial movements. In this connection the sleeve 24 is urged forwardly by a helical spring 26 housed in an annular space afforded between the sleeve 24 and the barrel 13 and bearing at opposite ends upon shoulders afforded by these parts (see Figure 5), the arrangement being such that normally the gripping jaws or blades 16 are closed or together as shown in Figure 6 but are opened or moved apart by their springs 17 when the sleeve 24 is moved rearwardly over the barrel 13 and against the action of the spring 26, thereby permitting the ends of the wires which are to be twisted together to be inserted in the chuck by way of the member 23, between the jaws or blades 16, through the hole 21 and up to the abutment 20, whereupon the sleeve 24 is released to force the jaws or blades 16 into gripping engagement with the inserted ends of wire.

In order to twist the gripped ends of the strands of wire together, it is necessary to reciprocate the chuck with respect to the casing 1. This may be done by pulling on the gripped strands of wire, held in one hand, so as to draw the chuck and its associated rod 11 and rack bar 15 outwardly or forwardly from the casing 1, which is held in the other hand. The outward movement of the rack bar 15 rotates the sprocket wheel 4 which, through the medium of the pawl 8 and ratchet wheel 5, rotates the worm wheel 3 which in turn rotates the worm 9 and its associated rod 11 and chuck, thereby causing the gripped wires to be twisted together during the said outward movement. If the amount of twist put into the joint is not sufficient, the tension is released and the chuck and its rod 11 and associated rack bar 15 are allowed to return to their normal positions under the action of the spring 10 which was compressed during the outward movement. During this inward movement the rack bar 15 rotates the spur wheel 4 in a reverse direction, but the pawl 8 rides over the teeth of the ratchet wheel 5 so that no drive is transmitted to the worm wheel 3 and hence the chuck is not rotated. Further twist is imparted to the gripped ends of the wires by repeating the outward movement of the chuck rod 11 and associated rack bar 15. When sufficient twist has been put into the wires they are released from the chuck by moving the chuck sleeve 24 against the action of the spring 26 so as to permit the springs 17 to come into action and open or move apart the gripping jaws or blades 16. Should the extreme ends of the wires be broken off by the gripping jaws or blades 16 as a result of the twisting being carried too far, the pieces broken off can pass or fall out by way of the holes in the spider 19, bore of the barrel 13, and holes in the rear end of the latter (see Figure 5) so that the chuck will not become chocked up to interfere with the entry of further ends of wire between the said jaws or blades 16.

In order to facilitate the drawing out of the chuck, the arm 14 has fixed to it a hook 27 with which a finger can be engaged to assist in pulling, and this hook 27 also enables the apparatus or tool to be hung upon the finger in a depending position out of the way, say whilst insulating the joint after it has been made.

In electrical and telephone work, the present practice is to strip the paper or other insulation from the wire by means of pliers prior to making a twist joint, and this method is liable to fracture said wire. In order to obviate this danger the apparatus may, as shown be provided with a stripping device in the form of a disc 28 having a plurality of pairs of through slots 29, the slots of each pair starting at a common point, on the periphery of the disc 28 and diverging toward the centre. The edges of the slots 29 are sharpened and the pairs of slots 29 are of different widths to take different gauges or thickness of wire. The disc 28 is rotatably mounted by means of a stud 30 on that end of the apparatus opposite to the chuck and is adapted to be retained in any one of a number of predetermined positions by means of a spring pressed ball 31 engaging any one of a series of dimples or depressions 32 in said disc, the arrangement being such as to permit any pair of slots 29 to be presented for use according to the gauge of wire to be employed. In this connection the stripping disc 28 may be used in conjunction with a knife 33 for trimming off the ends of the wires. The knife is pivoted at 34 to the casing 1, and is carried by or is in the form of a lever working in conjunction with a fixed blade 35 mounted on the casing 1 at an appropriate distance from the disc 28.

Thus to trim-off and strip the ends of a pair of wires, said ends are laid across the blade 35 and pressed down into the appropriately aligned pair of slots 29 so as to cut through the insulation, whereupon the knife 33 is operated to cut through the wires and the latter are then withdrawn together or pulled through the slots 29 so as to strip the insulation from the trimmed ends.

The trimmed ends are now ready to be placed in the chuck and twisted together. A pivoted hook catch 36 is provided on the side of the casing 1 for retaining the knife 33 in a down or safe position when not in use.

It will be observed that when twisting the wires together the apparatus starts from rest and the slowest rotation and consequently the slackest twisting takes place first, in contrast with the opposite state of affairs which has existed to their detriment, in joints as previously made. Moreover the amount of twist put into a joint is positively controlled by the operator, whilst the use of the apparatus enables a considerable saving in time and material to be effected by reason of the simplicity of the operation and the reduction of waste by stripping just the correct amount of insulation from the wire.

I claim:—

1. In a device for twisting together the ends of wire, a rod, wire engaging means carried by said rod, said rod being adapted for reciprocating movement, and means for rotating said rod during movement in one direction, said rotating means being inoperative during movement in the other direction.

2. In a device for twisting together the ends of wire, a support, a rod carried by the support, wire engaging means on said rod, said rod having a normal position with respect to the support and being adapted for longitudinal movement with respect to the same, means for rotating said rod when it is moved from its normal position, and means for returning said rod to its normal position after such movement, said rotating means being inoperative during the return movement of said rod.

3. In a device for twisting together the ends of wire, a support, a rod carried by the support, wire engaging means on said rod, said rod having a normal position with respect to the support and being adapted for longitudinal movement with respect to the same, means for rotating said rod as it is moved from its normal position, and means for disengaging the rotating means as said rod is moved toward its normal position.

4. In a device of the character described, a support, a rod carried by the support, work engaging means on said rod, said rod being adapted for outward and inward movement with respect to the support, and means for rotating said rod when the same is moved outwardly from the support, said rotating means being inoperative when the rod is moved inwardly with respect to the support.

5. In a device for twisting together the ends of wire, a support, a rod carried by the support, wire engaging means on said rod, said rod being adapted for reciprocating movement with respect to the support, a gear carried by said rod, and means on the support engaging said gear for rotating said rod during movement in one direction, said rotating means being inoperative during movement in the other direction.

6. In a device of the character described, a rod, work engaging means on said rod, an operating member, said rod and member being adapted for reciprocating movement, and means between the member and the rod to cause rotation of the latter during the reciprocating movement of said member.

7. In a device of the character described, a support, a rod, work engaging means on said rod, an operating member, said rod and member being adapted for longitudinal movement with respect to the support, and means for longitudinally moving and rotating said rod when the member is moved with respect to the support.

8. In a device of the character described, a support, a rod, work engaging means on said rod, a rack bar including a rack, said rack bar and rod being adapted for reciprocation with respect to the support, a shaft mounted in said support, a pinion carried by said shaft engaging the rack, and a pair of intermeshing gears carried by said shaft and said rod to rotate the rod during its reciprocating movement.

9. In a device of the character described, a support, work engaging means, a carrier for said means including a gear and a rack capable of rotational movement with respect to one another, said carrier being adapted for reciprocation with respect to the support, a shaft in said support, a pinion carried by said shaft for engagement with the rack, and a gear carried by said shaft for engagement with said first named gear.

10. In a device of the character described, a support, work engaging means, a carrier for said means including a gear and a rack capable of rotational movement with respect to one another, said carrier being adapted for movement outwardly and inwardly with respect to the support, a shaft mounted in said support, a gear fixed to said shaft in engagement with said first named gear, a pinion mounted on said shaft in engagement with said rack, a ratchet fixed to said shaft, and a pawl carried by said pinion adapted to engage said ratchet to rotate said shaft when the carrier is moved outwardly from the support.

11. In a chuck, a head, a guide carried at one end of the head, a pair of opposed jaws in said guide, the outer ends of said jaws normally extending beyond the sides of the head, a sleeve surrounding the head and adapted for longitudinal movement with respect to the same, and means carried by said sleeve to engage the outer ends of said jaws to close the same.

12. In a chuck, a barrel having a closed end with a central aperture therein, a diametrical slot in the outer end face of the barrel, a pair of opposed jaws in said slot, the outer ends of said jaws extending beyond the periphery of said barrel, a sleeve surrounding said barrel and adapted for longitudinal movement with respect to the same, and an inclined surface on the interior of said sleeve at the outer end thereof to engage the outer ends of said jaws to force the same together.

13. The combination with a tool for twisting together the ends of wire, of a device mounted on said tool for stripping the insulation from the wire, said device comprising a rotatable plate having a plurality of spaced stripping apertures therein, and means for securing said plate against rotation with a selected stripping aperture in working position.

WILLIAM HORSFALL SIDDLE.